United States Patent
Furukawa et al.

(10) Patent No.: US 11,795,298 B2
(45) Date of Patent: Oct. 24, 2023

(54) POLYESTER RESIN COMPOSITION, LIGHT-REFLECTOR COMPONENT CONTAINING SAME, AND LIGHT REFLECTOR

(71) Applicant: TOYOBO MC CORPORATION, Osaka (JP)

(72) Inventors: Kaori Furukawa, Otsu (JP); Takahiro Shimizu, Otsu (JP); Takuya Shimoharai, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 422 days.

(21) Appl. No.: 16/982,256

(22) PCT Filed: Mar. 25, 2019

(86) PCT No.: PCT/JP2019/012393
§ 371 (c)(1),
(2) Date: Sep. 18, 2020

(87) PCT Pub. No.: WO2019/188921
PCT Pub. Date: Oct. 3, 2019

(65) Prior Publication Data
US 2021/0047499 A1    Feb. 18, 2021

(30) Foreign Application Priority Data
Mar. 26, 2018   (JP) .................. 2018-058292

(51) Int. Cl.
| C08K 5/098 | (2006.01) |
| C08K 3/26 | (2006.01) |
| C08K 3/30 | (2006.01) |
| C08K 3/34 | (2006.01) |
| C08K 3/36 | (2006.01) |
| C08L 67/02 | (2006.01) |
| G02B 5/08 | (2006.01) |

(52) U.S. Cl.
CPC ............. *C08K 5/098* (2013.01); *C08K 3/26* (2013.01); *C08K 3/30* (2013.01); *C08K 3/346* (2013.01); *C08K 3/36* (2013.01); *C08L 67/02* (2013.01); *G02B 5/0808* (2013.01); *C08K 2003/265* (2013.01); *C08K 2003/3045* (2013.01)

(58) Field of Classification Search
CPC combination set(s) only.
See application file for complete search history.

(56) References Cited

U.S. PATENT DOCUMENTS

| 5,981,628 A | 11/1999 | Takamoto et al. |
| 6,579,609 B1 | 6/2003 | Talibuddin |
| 8,569,403 B2 | 10/2013 | Shirai et al. |
| 10,385,205 B2 | 8/2019 | Shimoharai et al. |
| 10,550,262 B2 | 2/2020 | Shimoharai et al. |
| 11,001,705 B2 | 5/2021 | Shimoharai et al. |
| 11,001,706 B2 | 5/2021 | Shimoharai et al. |
| 2002/0075686 A1 | 6/2002 | Kosugi et al. |
| 2003/0096122 A1 | 5/2003 | Mercx et al. |
| 2006/0142438 A1 | 6/2006 | Ishii et al. |
| 2006/0270824 A1 | 11/2006 | Leemans et al. |
| 2006/0291215 A1* | 12/2006 | Shirai ............... B29C 45/0013 362/341 |
| 2007/0185257 A1 | 8/2007 | Wursche et al. |
| 2007/0254150 A1 | 11/2007 | Seino et al. |
| 2007/0265382 A1 | 11/2007 | Yamamoto |
| 2007/0275242 A1 | 11/2007 | Gopal et al. |
| 2007/0282056 A1 | 12/2007 | Schellekens et al. |
| 2008/0064824 A1 | 3/2008 | Suzuki et al. |
| 2008/0161468 A1 | 7/2008 | Juikar et al. |
| 2008/0167410 A1 | 7/2008 | Shim et al. |
| 2008/0246191 A1 | 10/2008 | Agarwal et al. |
| 2009/0264611 A1 | 10/2009 | Hamano et al. |
| 2009/0318588 A1 | 12/2009 | Kim et al. |
| 2010/0309571 A1 | 12/2010 | Watari et al. |
| 2011/0004983 A1 | 1/2011 | Yagura et al. |

(Continued)

FOREIGN PATENT DOCUMENTS

| CN | 1753930 | 3/2006 |
| CN | 1993424 | 7/2007 |

(Continued)

OTHER PUBLICATIONS

Office Action dated Dec. 22, 2020, in corresponding Chinese Patent Application No. 201880009861.2, with English translation.
Office Action dated Dec. 22, 2022, in corresponding U.S. Appl. No. 16/482,832.
Office Action dated Aug. 7, 2019 in Chinese Patent Application No. 201680051143.2, with English translation.
International Search Report dated Apr. 24, 2018 in International (PCT) Application No. PCT/JP2018/002535.

(Continued)

*Primary Examiner* — Robert T Butcher
(74) *Attorney, Agent, or Firm* — Wenderoth, Lind & Ponack, L.L.P.

(57) ABSTRACT

The polyester resin composition includes: a polyester resin A containing 82 to 88 mass % of a polybutylene terephthalate resin and 12 to 18 mass % of a polyethylene terephthalate resin; a metal organic acid salt B that is either one or both of an alkali metal organic acid salt and an alkaline earth metal organic acid salt; and an inorganic filler C having an average particle diameter of 0.05 to 3 μm in an amount of 1 to 13 parts by mass based on 100 parts by mass of the polyester resin A, wherein the polyester resin composition includes either one or both of alkali metal atoms and alkaline earth metal atoms in an amount of 0.000005 to 0.05 parts by mass based on 100 parts by mass of the polyester resin A, and a content of linear oligomers of polybutylene terephthalate or the like is not more than 1000 mg/kg.

12 Claims, No Drawings

(56) References Cited

U.S. PATENT DOCUMENTS

| | | |
|---|---|---|
| 2013/0112271 A1 | 5/2013 | Ikehata et al. |
| 2013/0131255 A1 | 5/2013 | Pottie et al. |
| 2013/0253145 A1 | 9/2013 | Sakai et al. |
| 2014/0127441 A1 | 5/2014 | Nakamura et al. |
| 2014/0296386 A1 | 10/2014 | Maeda et al. |
| 2015/0068601 A1 | 3/2015 | Ikehata et al. |
| 2015/0087034 A1 | 3/2015 | Utsunomiya et al. |
| 2015/0368459 A1 | 12/2015 | Yamanaka et al. |
| 2017/0190906 A1 | 7/2017 | Mutou |
| 2018/0126714 A1 | 5/2018 | Motoshiromizu et al. |
| 2018/0282538 A1* | 10/2018 | Shimoharai ............ C08K 13/06 |
| 2018/0282539 A1 | 10/2018 | Yasui et al. |
| 2018/0319975 A1 | 11/2018 | Shimoharai et al. |
| 2019/0002687 A1 | 1/2019 | Shimoharai et al. |
| 2019/0375933 A1 | 12/2019 | van Nispen |
| 2020/0010667 A1 | 1/2020 | Shimoharai et al. |
| 2020/0231801 A1 | 7/2020 | Shimoharai et al. |

FOREIGN PATENT DOCUMENTS

| | | |
|---|---|---|
| CN | 101372550 | 2/2009 |
| CN | 101410442 | 4/2009 |
| CN | 101428478 | 5/2009 |
| CN | 101501133 | 8/2009 |
| CN | 101679728 | 3/2010 |
| CN | 103237844 | 8/2013 |
| CN | 104672797 | 6/2015 |
| CN | 104861587 | 8/2015 |
| CN | 104918997 | 9/2015 |
| CN | 106471059 | 3/2017 |
| CN | 108026358 | 5/2018 |
| CN | 108473753 | 8/2018 |
| DE | 10 2009 020 211 | 11/2010 |
| EP | 3 327 085 | 5/2018 |
| JP | 06-9858 | 1/1994 |
| JP | 07-062116 | 3/1995 |
| JP | 10-030054 | 2/1998 |
| JP | 2001-089590 | 4/2001 |
| JP | 2002-121273 | 4/2002 |
| JP | 2003-026905 | 1/2003 |
| JP | 2004-075867 | 3/2004 |
| JP | 2004-175889 | 6/2004 |
| JP | 2004-323837 | 11/2004 |
| JP | 2006-117768 | 5/2006 |
| JP | 2006-176711 | 7/2006 |
| JP | 2007-146047 | 6/2007 |
| JP | 2007-161840 | 6/2007 |
| JP | 2008-280498 | 11/2008 |
| JP | 2008-291238 | 12/2008 |
| JP | 2009-102581 | 5/2009 |
| JP | 2009-227749 | 10/2009 |
| JP | 2009-235156 | 10/2009 |
| JP | 2009-292897 | 12/2009 |
| JP | 2010-155900 | 7/2010 |
| JP | 2010-189584 | 9/2010 |
| JP | 2012-057152 | 3/2012 |
| JP | 2013-159732 | 8/2013 |
| JP | 5284557 | 9/2013 |
| JP | 5292877 | 9/2013 |
| JP | 2014-028883 | 2/2014 |
| JP | WO2012/147871 | 7/2014 |
| JP | 2014-210850 | 11/2014 |
| JP | 5864021 | 2/2016 |
| JP | 5895567 | 3/2016 |
| JP | 2017-036442 | 2/2017 |
| JP | 2017-48374 | 3/2017 |
| JP | 6119936 | 4/2017 |
| JP | 6197975 | 9/2017 |
| TW | 201718761 | 6/2017 |
| WO | 00/11071 | 3/2000 |
| WO | 2005/121254 | 12/2005 |
| WO | 2008/133262 | 11/2008 |
| WO | 2011/148992 | 12/2011 |
| WO | 2012/147871 | 11/2012 |
| WO | 2013/005823 | 1/2013 |
| WO | 2013/072310 | 5/2013 |
| WO | 2013/146281 | 10/2013 |
| WO | 2016/117586 | 7/2016 |
| WO | 2016/167084 | 10/2016 |
| WO | 2017/014239 | 1/2017 |
| WO | 2017/038581 | 3/2017 |
| WO | WO 2017/038581 | * 3/2017 |
| WO | 2017/110917 | 6/2017 |
| WO | 2018/143077 | 8/2018 |
| WO | 2018/143100 | 8/2018 |

OTHER PUBLICATIONS

International Search Report dated Apr. 24, 2018 in International (PCT) Application No. PCT/JP2018/002536.
Notice of Grounds of Rejection dated Jul. 30, 2019 in Japanese Patent Application No. 2018-510892 with English translation.
Notice of Grounds of Rejection dated Jul. 30, 2019 in Japanese Patent Application No. 2018-510893 with English translation.
International Search Report dated Mar. 14, 2017 in International Application No. PCT/JP2016/088199.
Notice of Grounds of Rejection dated May 9, 2017 in Japanese Patent Application No. 2017-511791, with English translation.
U.S. Appl. No. 16/064,583, filed Jun. 21, 2018, entitled "Polyester Resin Composition, Light-Reflector Component Containing Same, Light Reflector, and Method for Producing Polyester Resin Composition".
International Search Report dated Oct. 25, 2016 in International Application No. PCT/JP2016/074663.
Journal of Zhejiang University (Science Edition) vol. 29, No. 1, Jan. 2002, pp. 67-72.
Office Action dated Jun. 27, 2019 in Chinese Patent Application No. 201680051102.3, with English translation.
Office Action dated Aug. 8, 2019, in U.S. Appl. No. 15/756,761.
International Search Report dated Oct. 25, 2016 in International Application No. PCT/JP2016/074662.
Office Action dated Jan. 24, 2019 in U.S. Appl. No. 15/756,749.
U.S. Appl. No. 15/756,749, filed Mar. 1, 2018, entitled "Polyester Resin Composition, Light-Reflector Component Containing Same, and Light Reflector".
Office Action dated Jan. 27, 2020 in U.S. Appl. No. 15/756,761.
U.S. Appl. No. 15/756,761, filed Mar. 1, 2018, entitled "Thermoplastic Polyester Resin Composition and Light Reflector Using Same".
U.S. Appl. No. 16/482,838, filed Aug. 1, 2019, entitled "Polyester Resin Composition, and Light Reflector Component and Light Reflector Including Polyester Resin Composition".
Office Action dated Dec. 3, 2019 in Chinese Patent Application No. 201680075670.7 , with English translation.
Office Action dated Feb. 19, 2020 in U.S. Appl. No. 16/064,583.
Office Action dated Jun. 16, 2020 in U.S. Appl. No. 16/064,583.
Office Action dated Jul. 10, 2020 in U.S. Appl. No. 15/756,761.
Office Action dated Aug. 25, 2020 in U.S. Appl. No. 16/482,838.
Machine translation of WO 2017/038581 A1, InnovationQ Plus (IP.com). (Year: 2017) (provided in U.S. Appl. No. 16/482,838).
U.S. Appl. No. 16/482,832, filed Aug. 1, 2019 entitled "Polyester Resin Composition, and Light Reflector Component and Light Reflector Including Polyester Resin Composition".
Office Action dated Jul. 20, 2022, in U.S. Appl. No. 16/482,832.
Office Action dated May 25, 2022, in Chinese Patent Application No. 201980022326.5, with English translation.
Office Action dated Feb. 3, 2021, in corresponding Chinese Patent Application No. 201880009854.2, with English translation.
International Search Report (ISR) dated Jun. 18, 2019 in corresponding International Application No. PCT/JP2019/012393.

* cited by examiner

POLYESTER RESIN COMPOSITION, LIGHT-REFLECTOR COMPONENT CONTAINING SAME, AND LIGHT REFLECTOR

TECHNICAL FIELD

The present invention relates to a polyester resin composition, a light-reflector component containing the polyester resin composition, and a light reflector.

BACKGROUND ART

A reinforced resin has been used widely for components of an automobile lamp and other lighting fixtures as well as a light-reflector component having a surface provided with a light reflection layer. These components are required to have high brightness appearance (smoothness), uniform reflectivity, and the like. The reinforced resin is provided with heat resistance by mixing an inorganic filler such as a polyethylene terephthalate resin, talc, or mica in a polybutylene terephthalate resin. For a lamp member referred to as an "extension", a sufficient light collecting/reflecting effect is not obtained without performing a step of performing a primer process onto a surface of such a reinforced resin and then performing aluminum metallization.

In recent years, a polybutylene terephthalate resin or a polycarbonate resin has been often used, each of which attains excellent surface smoothness without such a primer process step. However, heat resistance thereof may be insufficient. Moreover, polybutylene terephthalate has a large shrinkage factor. Hence, when a molded article has a complicated shape, releasability may be greatly compromised, thus resulting in restricted design of the molded article. On the other hand, when a polyethylene terephthalate resin and a small amount of inorganic filler are mixed in the polybutylene terephthalate resin, excellent smoothness, suppressed shrinkage factor, and more excellent heat resistance are attained without the primer process.

Among resin compositions each obtained by mixing the polyethylene terephthalate resin and the small amount of inorganic filler in the above polybutylene terephthalate resin, a resin composition has been proposed which attains not only smoothness and heat resistance but also excellent appearance, fogging, and less residues on mold.

PTL 1 proposes a polyester resin composition having excellent heat resistance and obtained without the primer process step. The polyester resin composition is obtained by specifying average particle diameter and amount of addition of an inorganic filler and blending the inorganic filler with a polybutylene terephthalate resin pellet and polyester resin powder. PTL 2 proposes a polyester resin composition having excellent heat resistance and excellent appearance with less occurrence of problems (orange-peel defect and whitening) on a metallization layer. The polyester resin composition is obtained by mixing a polybutylene terephthalate resin with a polyethylene terephthalate resin and barium sulfate having an average particle diameter of less than or equal to 1 μm. PTL 3 proposes a resin composition excellent in fogging and surface smoothness. The resin composition is obtained by mixing a polybutylene terephthalate resin with a polyethylene terephthalate resin, a spherical inorganic filler having an average particle diameter of less than or equal to 1.5 μm, and a fatty acid metal salt. PTL 4 proposes a polyester resin composition that attains low gas emission and high heat resistance and that can significantly suppress residues on mold during continuous molding. The polyester resin composition is obtained by mixing a polybutylene terephthalate resin with a polyethylene terephthalate resin and an inorganic filler having an average particle diameter of 0.05 to 0.3 μm, or by mixing the polybutylene terephthalate resin with the polyethylene terephthalate resin, a spherical inorganic filler having an average particle diameter of less than or equal to 1.5 μm, and a metal organic acid salt.

CITATION LIST

Patent Literature

PTL 1: Japanese Patent No. 5864021
PTL 2: Japanese Patent No. 5284557
PTL 3: Japanese Patent No. 5292877
PTL 4: Japanese Patent Laying-Open No. 2017-48374

SUMMARY OF INVENTION

Technical Problem

In recent years, progress in molding technique has led to improvement in designing the shape of a molded article as well as increase in a required level of mirror-surface polishing for molds. As a result, a problem frequently arises in terms of formation of a mark (hereinafter, referred to as "flow mark") in the form of annual rings as seen in trees, when polybutylene terephthalate and polyethylene terephthalate are used together. Such a flow mark is formed at a portion corresponding to a location at which injection speed is decreased rapidly, such as a flow terminal, a merged location of flow, or a region involving a change in thickness. The flow mark can be reduced to some extent by adjusting an injection speed and a mold temperature. However, the reduction of flow mark may be insufficient and poor appearance, by which the molded article is to be excluded, may be resulted. Such a new problem cannot be solved by the conventional technique. Hence, there has been a commercial demand for a thermoplastic polyester resin composition in which a flow mark is less likely to be formed even when an injection speed is made as low as possible even though such a slow injection speed is unfavorable.

As a result of diligent study to suppress formation of such a flow mark, the present inventors have found that a polyester resin composition that attains low gas emission, high heat resistance, and excellent surface smoothness and that is suppressed in terms of formation of the flow mark is obtained by setting an amount of a polyethylene terephthalate resin, which is to be mixed in a polybutylene terephthalate resin, to fall within a specific range. Accordingly, the present inventors have arrived at the present invention.

That is, the present invention has an object to provide: a polyester resin composition that attains low gas emission, high heat resistance, and excellent surface smoothness and that is suppressed in terms of formation of the flow mark; a light-reflector component containing the polyester resin composition; and a light reflector.

Solution to Problem

Specifically, the present invention is as follows.
[1] A polyester resin composition comprising: a polyester resin A that contains 82 to 88% by mass of a polybutylene terephthalate resin and 12 to 18% by mass of a polyethylene terephthalate resin; a metal organic acid salt B that is either one or both of an alkali metal organic acid salt and an alkaline earth metal organic acid salt; and an inorganic filler C having an average particle diameter of 0.05 to 3 μm in an amount of 1 to 13 parts by mass based on 100 parts by mass of the polyester resin A, wherein the polyester resin composition includes either one or both of alkali metal atoms and alkaline earth metal atoms in an amount of 0.000005 to 0.05 parts by mass based on 100 parts by mass of the polyester resin A, in the polyester resin composition, a content of linear oligomers of polybutylene terephthalate, or a content of the linear oligomers of the polybutylene terephthalate and linear oligomers of polyethylene terephthalate is less than or equal to 1000 mg/kg, and when the polyester resin composition is injection-molded, using a mirror-surface mold having a temperature of 45° C. and surface-finished with #16000, at a molding temperature of 260° C. for a packing time of greater than or equal to 4.5 seconds, a flat plate of 100 mm×100 mm×2 mmt is obtained to have a maximum height roughness (Rz) of less than or equal to 0.70 μm.

[2] The polyester resin composition according to [1], wherein the polyester resin composition includes either one or both of the alkali metal atoms and the alkaline earth metal atoms in an amount of 0.0005 to 0.05 parts by mass based on 100 parts by mass of the polyester resin A.

[3] The polyester resin composition according to [1] or [2], wherein a metal kind of the metal organic acid salt B is one or two or more kinds selected from a group consisting of lithium, sodium, potassium, calcium, and magnesium.

[4] The polyester resin composition according to any one of [1] to [3], wherein the metal organic acid salt B is one or two or more kinds selected from a group consisting of lithium acetate, sodium acetate, potassium acetate, calcium acetate, magnesium acetate, lithium benzoate, sodium benzoate, and potassium benzoate.

[5] The polyester resin composition according to any one of [1] to [4], wherein the inorganic filler C is one or two or more kinds selected from a group consisting of calcium carbonate, silica, kaolin, and barium sulfate.

[6] A light-reflector component comprising the polyester resin composition according to any one of [1] to [5].

[7] A light reflector, wherein a light reflective metal layer is formed at least on a portion of a surface of the light-reflector component according to [6].

Advantageous Effects of Invention

According to the present invention, there can be provided a polyester resin composition that attains low gas emission, high heat resistance, and excellent surface smoothness, and that can suppress formation of the flow mark.

DESCRIPTION OF EMBODIMENTS

Hereinafter, the present invention will be described in detail.

[Polyester Resin Composition]

The present invention is a polyester resin composition including a polyester resin A that contains 82 to 88% by mass (greater than or equal to 82% by mass and less than or equal to 88% by mass; in a case where a numerical range is expressed using "to" in the present specification, the range includes the numerical values of the upper limit and the lower limit) of a polybutylene terephthalate resin and 12 to 18% by mass of a polyethylene terephthalate resin. The polyester resin composition includes a metal organic acid salt B that is either one or both of an alkali metal organic acid salt and an alkaline earth metal organic acid salt, and an inorganic filler C having an average particle diameter of 0.05 to 3 μm in an amount of 1 to 13 parts by mass based on 100 parts by mass of the polyester resin A. Further, the polyester resin composition includes either one or both of alkali metal atoms and alkaline earth metal atoms in an amount of 0.000005 to 0.05 parts by mass based on 100 parts by mass of the polyester resin A. Furthermore, in the polyester resin composition, the content of linear oligomers of polybutylene terephthalate, or the content of the linear oligomers of polybutylene terephthalate and the linear oligomers of polyethylene terephthalate is less than or equal to 1000 mg/kg.

By including a metal organic acid salt B, the polyester resin composition according to the present invention can suppress the generation of outgas [tetrahydrofuran (hereinafter, may also be referred to as "THF"), and the like] during molding, suppress the transportation and adhesion of the cyclic oligomers and linear oligomers contained in the composition to a mold by THF, and suppress the residues on mold based on these oligomers.

In addition, the polyester resin composition may contain a release agent D described later. Further, the polyester resin composition may contain various kinds of additives as needed within the range not impairing the effects of the present invention. Examples of the additive include a modifier, a heat-resistant stabilizer, an antioxidant, a UV absorber, a light stabilizer, a plasticizer, a denaturant, an antistatic agent, a flame retardant, a dye, and a pigment. In the polyester resin composition of the present invention, the total of the polyester resin A, the metal organic acid salt B, the inorganic filler C, and the release agent D (the release agent D is mixed as required) occupies preferably greater than or equal to 85% by mass, more preferably greater than or equal to 90% by mass, and furthermore preferably greater than or equal to 95% by mass.

Further, the polyester resin composition according to the present invention attains low gas emission, high heat resistance, surface smoothness, suppression of a flow mark. In particular, it is effective to apply the polyester resin composition to: a component of an automobile lamp, a lighting fixture, or the like; a light-reflector component having a surface provided with a light reflection layer; and the like.

<Polyester Resin A>

The polyester resin A in the present invention contains 82 to 88% by mass of a polybutylene terephthalate resin, and 12 to 18% by mass of a polyethylene terephthalate resin. The polyester resin A is preferably composed of these two components although it is not excluded that the polyester resin A contains a third component other than the polybutylene terephthalate resin and the polyethylene terephthalate resin. The polyester resin A in the polyester resin composition is not particularly limited as long as the polyester resin A is the main component, and preferably greater than or equal to 90% by mass, and more preferably greater than or equal to 92% by mass.

(Polybutylene Terephthalate Resin)

A polybutylene terephthalate resin is a polymer that can be obtained by a common polymerization method, for example, by a polycondensation reaction of a dicarboxylic acid having terephthalic acid or an ester forming derivative thereof as the main component with a diol having 1,4-butanediol or an ester forming derivative thereof as the main component. In the polybutylene terephthalate resin, the repeating unit of butylene terephthalate is preferably greater than or equal to 80% by mole, more preferably greater than or equal to 90% by mole, furthermore preferably greater than or equal to 95% by mole, and most preferably 100% by mole.

The polybutylene terephthalate resin may contain other polymerization components within the range not impairing the characteristics, for example, in an amount of less than or equal to around 20% by mass. Examples of the polybutylene terephthalate resin containing other polymerization components include polybutylene (terephthalate/isophthalate), polybutylene (terephthalate/adipate), polybutylene (terephthalate/sebacate), polybutylene (terephthalate/decane dicarboxylate), polybutylene (terephthalate/naphthalate), and poly(butylene/ethylene) terephthalate. These components may be used singly alone, or by mixing greater than or equal to two kinds thereof.

The intrinsic viscosity (IV) of the polybutylene terephthalate resin is suitably 0.3 to 1.6 dl/g, more suitably 0.45 to 1.35 dl/g, furthermore suitably 0.5 to 1.2 dl/g, and particularly suitably 0.55 to 1.05 dl/g. When the intrinsic viscosity (IV) of the polybutylene terephthalate resin is 0.3 to 1.6 dl/g, the polyester resin composition of the present invention has favorable mechanical properties and moldability. As for the above-described intrinsic viscosity (IV), using a mixed solvent of phenol/tetrachloroethane (mass ratio 1/1) by a Ubbelohde-type viscometer, a time (seconds) required for the dropping of each of a polybutylene terephthalate resin solution having a concentration of 0.4 g/dl at 30° C., and the mixed solvent only is measured, and the intrinsic viscosity (IV) is a value obtained from the following equation (I) on the basis of ASTM D4603.

$$\text{Intrinsic viscosity (IV)} = 0.25(\eta_r - 1 + 3 \ln \eta_r)/C \quad \text{(I)}$$

In the above-described equation (I), $\eta_r = \eta/\eta_0$, $\eta$ is a time (seconds) required for the dropping of the polybutylene terephthalate resin solution, $\eta_0$ is a time (seconds) required for the dropping of the mixed solvent only, and C is a concentration (g/dl) of a polybutylene terephthalate resin solution.

The terminal carboxyl group of the polybutylene terephthalate resin plays a catalytic role in a hydrolysis reaction of a polymer, therefore, the hydrolysis is accelerated as the amount of the terminal carboxyl group is increased. For this reason, it is preferred that this terminal carboxyl group concentration is low. The terminal carboxyl group concentration of the polybutylene terephthalate resin is preferably less than or equal to 40 eq/ton, more preferably less than or equal to 30 eq/ton, furthermore preferably less than or equal to 25 eq/ton, and particularly preferably less than or equal to 20 eq/ton.

The terminal carboxyl group concentration (unit:eq/ton) of the polybutylene terephthalate resin can be measured, for example, by dissolving a predetermined amount of a polybutylene terephthalate resin in benzyl alcohol, and by titrating the resultant mixture using a 0.01 mol/l benzyl alcohol solution of sodium hydroxide. For the indicator, for example, a phenolphthalein solution may be used.

The terminal hydroxyl group of the polybutylene terephthalate resin causes backbiting mainly when melted, therefore becomes a starting point for forming THF that is one of outgasses, linear oligomers, and cyclic oligomers during molding. For this reason, in order to reduce the residues on mold, it is preferred that this terminal hydroxyl group concentration is reduced to suppress the backbiting during molding. The terminal hydroxyl group concentration of the polybutylene terephthalate resin is preferably less than or equal to 110 eq/ton, more preferably less than or equal to 90 eq/ton, furthermore preferably less than or equal to 70 eq/ton, and particularly preferably less than or equal to 50 eq/ton.

The terminal hydroxyl group concentration (unit:eq/ton) of the polybutylene terephthalate resin can be calculated by a predetermined calculation, for example, on the basis of the spectrum obtained by $^1$H-NMR measurement, from the peak value of the terephthalic acid derived from polybutylene terephthalate, and the peak value of the terminal 1,4-butanediol.

(Polyethylene Terephthalate Resin)

A polyethylene terephthalate resin is a polymer that can be obtained by a common polymerization method, for example, by a polycondensation reaction of a dicarboxylic acid having terephthalic acid or an ester forming derivative thereof as the main component with a diol having ethylene glycol or an ester forming derivative thereof as the main component. In the polyethylene terephthalate resin, the repeating unit of ethylene terephthalate is preferably greater than or equal to 80% by mole, more preferably greater than or equal to 90% by mole, furthermore preferably greater than or equal to 95% by mole, and particularly preferably 100% by mole.

The polyethylene terephthalate resin can contain other polymerization components within the range not impairing the characteristics, for example, in an amount of less than or equal to around 20% by mass. Examples of the polyethylene terephthalate resin containing other polymerization components include polyethylene (terephthalate/isophthalate), polyethylene (terephthalate/adipate), polyethylene (terephthalate/sebacate), polyethylene (terephthalate/decane dicarboxylate), polyethylene (terephthalate/naphthalate), poly (ethylene/cyclohexane dimethyl) terephthalate, and poly (butylene/ethylene) terephthalate. These components may be used singly alone, or by mixing greater than or equal to two kinds thereof. By using the polyethylene terephthalate resins described above, the molding shrinkage factor of the polyester resin composition can be controlled in the present invention.

The intrinsic viscosity (IV) of the polyethylene terephthalate resin is suitably 0.36 to 1.6 dl/g, more suitably 0.45 to 1.35 dl/g, furthermore suitably 0.5 to 1.2 dl/g, and particularly suitably 0.55 to 1.05 dl/g. When the intrinsic viscosity (IV) of the polyethylene terephthalate resin is 0.36 to 1.6 dl/g, the polyester resin composition of the present invention has favorable mechanical properties and moldability. The above-described intrinsic viscosity (IV) may be measured by the same method as the method by which the intrinsic viscosity (IV) of the polybutylene terephthalate resin has been measured.

In the present invention, in order to attain an excellent surface appearance of the molded article by preventing floating of the inorganic filler C and formation of a flow mark during molding, the polyester resin A contains 82 to 88% by mass of the polybutylene terephthalate resin, and 12 to 18% by mass of the polyethylene terephthalate resin for the purpose of controlling a crystallization behavior of the polyester resin composition. By containing the polyethylene terephthalate resin as described above, the molding shrinkage of the polyester resin composition can be controlled. On the other hand, when the content of the polyethylene terephthalate resin is more than 18% by mass, the effect of suppressing the formation of the flow mark is not sufficiently obtained. When the content of the polyethylene terephthalate resin is less than 12% by mass, the molding shrinkage becomes large or deteriorated appearance due to floating of the filler is observed. The polyester resin A preferably contains 85 to 88% by mass of the polybutylene terephthalate resin, and 12 to 15% by mass of the polyethylene terephthalate resin.

The total amount of the polybutylene terephthalate resin and polyethylene terephthalate resin in the polyester resin A is preferably greater than or equal to 80% by mass, more preferably greater than or equal to 90% by mass, and furthermore preferably greater than or equal to 95% by mass. Further, the total amount of the polybutylene terephthalate resin and the polyethylene terephthalate resin may be 100% by mass.

(Titanium Catalyst)

The polybutylene terephthalate resin constituting the present invention can be obtained, for example, by an esterification reaction or a transesterification reaction using 1,4-butanediol and a titanium catalyst of terephthalic acid or terephthalic acid dialkyl. In the present invention, the content of the titanium catalyst to be contained in the polyester resin composition is defined by the content of titanium atoms.

The content of titanium atoms can be measured using a method of atomic emission, atomic absorption, or inductively coupled plasma (ICP), or the like after recovering the metal in the polymer by a method of wet ashing, or the like.

As the titanium catalyst, a known titanium compound can be used. Specific examples of the titanium catalyst include tetraalkyl titanate containing a titanium alkoxide such as tetraethyl titanate, tetraisopropyl titanate, tetra-n-propyl titanate, and tetra-n-butyl titanate, a partial hydrolysate thereof, a titanium chelate compound, titanium acetate, a titanyl oxalate compound such as titanyl oxalate, ammonium titanyl oxalate, sodium titanyl oxalate, potassium titanyl oxalate, calcium titanyl oxalate, and strontium titanyl oxalate, titanium trimellitate, titanium sulfate, titanium chloride, a hydrolysate of a titanium halide, titanium oxalate, titanium fluoride, potassium hexafluorotitanate, ammonium hexafluorotitanate, cobalt hexafluorotitanate, manganese hexafluorotitanate, titanium acetylacetonate, a titanium complex with a hydroxy polycarboxylic acid or a nitrogen-containing polycarboxylic acid, a composite oxide including titanium and silicon, or zirconium, a reactant of a titanium alkoxide and a phosphorus compound, and a reaction product of a titanium alkoxide and an aromatic polycarboxylic acid, or an acid anhydride thereof with a predetermined phosphorus compound.

Among them, from the viewpoint of suppressing the residues on mold, it is preferred to use any one selected from the group consisting of tetraalkyl titanate containing a titanium alkoxide such as tetraethyl titanate, tetraisopropyl titanate, tetra-n-propyl titanate, and tetra-n-butyl titanate, a partial hydrolysate thereof, and a titanium chelate compound. Further, it is more preferred to use any one selected from the group consisting of tetraisopropyl titanate, tetra-n-propyl titanate, tetra-n-butyl titanate, an ethyl acetoacetate titanium chelate, and triethanol titanium aminate.

Tin may be used as a catalyst in place of titanium or together with titanium. Further, in addition to titanium and tin, a magnesium compound such as magnesium acetate, magnesium hydroxide, magnesium carbonate, magnesium oxide, magnesium alkoxide, and magnesium hydrogen phosphate, a calcium compound such as calcium hydroxide, calcium carbonate, calcium oxide, calcium alkoxide, and calcium hydrogen phosphate, an antimony compound such as antimony trioxide, a germanium compound such as germanium dioxide, and germanium tetroxide, a manganese compound, a zinc compound, a zirconium compound, a cobalt compound, a phosphorus compound such as orthophosphoric acid, phosphorous acid, hypophosphorous acid, polyphosphoric acid, and an ester or metal salt thereof, and a reaction auxiliary such as sodium hydroxide may be used. In a case where the compound to be used as a reaction auxiliary overlaps with the metal organic acid salt B described later, the total amount of the metal organic acid salt B and the reaction auxiliary may be set to the content within the acceptable range as the metal organic acid salt B in the present invention.

(Linear Oligomer)

It is considered that in the present invention, the reason why the residues on mold during continuous molding can be suppressed is as follows.

In the polyester resin composition according to the present invention, the content of the linear oligomers of polybutylene terephthalate, or the content of the linear oligomers of polybutylene terephthalate and the linear oligomers of polyethylene terephthalate is less than or equal to 1000 mg/kg. In the present invention, a polybutylene terephthalate resin has the largest proportion in the polyester resin composition, therefore, it is preferred to suppress the content of the linear oligomers of polybutylene terephthalate to a low level. A linear oligomer has a melting point lower than that of a cyclic oligomer, and has a low glass transition temperature, therefore, easily adheres to a mold rather than the cyclic oligomer does. It is considered that the linear oligomer adhered to a mold becomes adhesive, plays a role as of a binder, and promotes the adhesion of the cyclic oligomer to the mold. For this reason, reduction of the content of the linear oligomers contained in the polyester resin composition extremely effectively contributes to the delaying of the start of the residues on mold at the time of continuous molding. Therefore, the reduction of the content of the linear oligomers is extremely important in suppressing the residues on mold.

As described above, in the present invention, it has been found that linear oligomers are the fundamental cause of the residues on mold. In addition, tetrahydrofuran is known to be generated by a backbiting reaction or the like of a terminal hydroxyl group, and from the outgas measurement described below, it has been also found that there is a positive correlation between the amount of the generated tetrahydrofuran and the degree of the residues on mold. That is, as the amount of the generated tetrahydrofuran is higher, the degree of the residues on mold becomes more severe. In this outgas measurement, a sample of 5 mg of the polyester resin composition is heated under the conditions at 265° C. for 10 minutes, the generated components are analyzed by using GC/MS (trade name: "TD-20/QP-2010 Ultra", manufactured by Shimadzu Corporation), and the amount of the generated tetrahydrofuran is measured. The detected components can be quantified in terms of toluene or the like. Further, the residues on mold can be evaluated by performing an acceleration test or the like as described later.

From the above, the linear oligomers contained in the polyester resin composition are injected outside the resin system at the time of injection molding in a state of being dissolved in the tetrahydrofuran that is generated during molding, and comes into contact with a mold. It is considered that at this time, the tetrahydrofuran having a low boiling point evaporates without remaining in the mold, but the linear oligomers dissolved in the tetrahydrofuran adhere as they are to the mold. Therefore, the reduction of the content of the generated tetrahydrofuran that serves as a medium also leads to the suppression of distilling the linear oligomers from the resin system, and as a result, the amount of the linear oligomers adhered to the mold is reduced, and the residues on mold can be suppressed.

Herein, in the present specification, in a case where the linear oligomer is a linear oligomer of polybutylene terephthalate, the linear oligomer means an oligomer having a linear structure in which a total of 2 to 13 units of the constitutional units derived from terephthalic acid and the constitutional units derived from 1,4-butanediol, are bonded to one another. Further, in a case where the linear oligomer is a linear oligomer of polyethylene terephthalate, the linear oligomer means an oligomer having a linear structure in which a total of 2 to 13 units of the constitutional units derived from terephthalic acid and the constitutional units derived from ethylene glycol, are bonded to one another. The linear oligomer has reactive functional groups composed of a hydroxyl group or a carboxyl group at both terminals, and both terminals may be carboxyl groups or hydroxyl groups in some cases. In addition, in a case where the cyclic oligomer is a cyclic oligomer of polybutylene terephthalate, the cyclic oligomer means an oligomer having a cyclic structure in which a total of 4 to 14 units of the constitutional units derived from terephthalic acid and the constitutional units derived from 1,4-butanediol, are bonded to one another. Further, in a case where the cyclic oligomer is a cyclic oligomer of polyethylene terephthalate, the cyclic oligomer means an oligomer having a cyclic structure in which a total of 4 to 14 units of the constitutional units derived from terephthalic acid and the constitutional units derived from ethylene glycol, are bonded to one another.

As described above, in the polyester resin composition according to the present invention, the content of the linear oligomers of polybutylene terephthalate, or the content of the linear oligomers of polybutylene terephthalate and the linear oligomers of polyethylene terephthalate is less than or equal to 1000 mg/kg. The content of the linear oligomer is preferably less than or equal to 950 mg/kg, more preferably less than or equal to 900 mg/kg, furthermore preferably less than or equal to 800 mg/kg, and particularly preferably less than or equal to 700 mg/kg. When the content of the linear oligomers exceeds 1000 mg/kg, the effect of suppressing the residues on mold becomes insufficient. The lower limit value of the content of the linear oligomers is ideally 0 mg/kg. Further, in a case where both of the linear oligomers of polybutylene terephthalate and the linear oligomers of polyethylene terephthalate are contained, the content of the linear oligomers is less than or equal to 1000 mg/kg in both.

On the other hand, the content of the cyclic oligomers may be less than or equal to 9000 mg/kg. The content of the cyclic oligomers is preferably less than or equal to 8000 mg/kg, and more preferably 6000 mg/kg. However, even if the content of the cyclic oligomers is around 6000 mg/kg, when the content of the linear oligomers exceeds 1000 mg/kg, the effect of suppressing the residues on mold becomes lowered. When the content of the linear oligomers is less than or equal to 1000 mg/kg, as the content of the cyclic oligomers is lower, the effect of suppressing the residues on mold tends to become higher. In this regard, when the content of the linear oligomers is less than or equal to 1000 mg/kg, the content of the cyclic oligomers that have been conventionally considered to be the cause of the residues on mold is relatively flexibly accepted, and the cyclic oligomers may be contained up to less than or equal to 9000 mg/kg.

As for the content of the linear oligomers and the cyclic oligomers, for example, the polyester resin composition is dissolved in a solvent including hexafluoroisopropanol/chloroform=2/3 (volume ratio), and the resultant mixture is precipitated by adding chloroform, methanol, or the like. Subsequently, the supernatant separated by filtration is dry-solidified, the dry-solidified material is dissolved in dimethylformamide, then the resultant mixture is filtered, and by analyzing the filtrate by a liquid chromatography analysis method, the content of the linear oligomers and the cyclic oligomers can be measured. For example, the content (quantitative value) of the linear oligomers is expressed in terms of bishydroxyethyl terephthalate (BHET), and the content (quantitative value) of the cyclic oligomers can be calculated in terms of a polyethylene terephthalate cyclic trimer.

The method for reducing the content of the linear oligomers to less than or equal to 1000 mg/kg is not particularly limited as long as it is a method capable of reducing the content of the linear oligomers to less than or equal to 1000 mg/kg. In the present invention, the proportion of the polybutylene terephthalate resin in the polyester resin composition is high, therefore, it is effective to reduce the content of the linear oligomers of the polybutylene terephthalate.

As the method for reducing the content of the linear oligomers to less than or equal to 1000 mg/kg, a method of adjusting with a titanium catalyst and a reaction auxiliary, a method of solid phase polymerization, a method of extracting linear oligomers with water or a solvent, or the like can be mentioned. As the method for reducing the content of cyclic oligomers to less than or equal to 9000 mg/kg, it is also not particularly limited, and for example, a method of adjusting temperature, time, a polymerization catalyst, and the like in polymerizing a polybutylene terephthalate resin, a method of solid phase polymerization, a method of heat-treating in a molten state after polymerization, a method for extracting cyclic oligomers by using a predetermined solvent, or the like can be mentioned. By the combination of these methods and other methods, both of the linear oligomers and the cyclic oligomers can also be reduced.

For example, in the method of solid phase polymerization of a polybutylene terephthalate resin, as the esterification or transesterification reaction proceeds, both of the terminal carboxyl group concentration and the terminal hydroxyl group concentration tend to lower. In this method, the molecular weight is increased, therefore, it is required to adjust the intrinsic viscosity (IV) before solid phase polymerization, and to adjust the temperature and time of solid phase polymerization.

In addition, in a case where a polyethylene terephthalate resin is contained in the polyester resin composition, the suppression of the content of the linear oligomers of polyethylene terephthalate can also contribute to the suppression of the residues on mold. Further, a method for reducing the amount of the generated tetrahydrofuran will be described in detail below.

<Metal Organic Acid Salt B>

The polyester resin composition according to the present invention contains a metal organic acid salt B that is either one or both of an alkali metal organic acid salt and an alkaline earth metal organic acid salt. The content is specified on the basis of either one or both of the alkali metal atoms and the alkaline earth metal atoms, specifically, either one or both of the alkali metal atoms and the alkaline earth metal atoms are contained in an amount of 0.000005 to 0.05 parts by mass based on 100 parts by mass of the polyester resin A. That is, in the present invention, the content of the metal organic acid salt B contained in the polyester resin composition is grasped by specifying the content of either one or both of the alkali metal atoms and the alkaline earth metal atoms. When the polyester resin composition includes both the alkali metal organic acid salt and the alkaline earth metal organic acid salt, the above-described content is a total amount of both the alkali metal atoms and the alkali earth metal atoms.

Herein, the reason why the content of the metal organic acid salt B contained in the polyester resin composition is grasped by specifying the content of either one or both of the alkali metal atoms and the alkaline earth metal atoms is as follows. That is, it is considered that the metal organic acid salt B is present in a state in which the metal ions are dissociated in the polyester resin composition, therefore, in order to know the content of the metal organic acid salt B, it is required to quantify either one or both of the metal (ions) and the organic acid (ions). However, an organic acid tends to volatilize easily, and has a structure similar to that of a polymer such as polybutylene terephthalate in many cases, therefore, the quantitative determination becomes difficult in many cases. On the other hand, a metal atom (alkali metal atom and alkaline earth metal atom) is relatively easy to remain in the polyester resin composition, and the quantitative determination is relatively easy. Accordingly, the content of the metal organic acid salt B in the polyester resin composition is grasped by specifying the content of either one or both of the alkali metal atoms and the alkaline earth metal atoms. Further, from such a reason, it is clear that either one or both of the alkali metal atoms and the alkaline earth metal atoms are derived from the metal organic acid salt B.

In addition, the content of alkali metal atoms and alkaline earth metal atoms in the polyester resin composition can be measured by ICP emission spectrometry.

In other words, the polyester resin composition according to the present invention contains greater than or equal to 0.05 mg and less than or equal to 500 mg of either one or both of the alkali metal atoms and the alkaline earth metal atoms per kg mass of the polyester resin A (hereinafter, also referred to as "mg/kg"). Further, in a case where the metal organic acid salt B contains both of the alkali metal organic acid salt and the alkaline earth metal organic acid salt, the total of both of the alkali metal atoms and the alkaline earth metal atoms are contained in an amount of 0.000005 to 0.05 parts by mass based on 100 parts by mass of the polyester resin A.

By the metal organic acid salt B, the backbiting reaction of the terminal hydroxyl groups possessed by the polybutylene terephthalate resin and the polyethylene terephthalate resin during molding can be reduced, and the amount of the generated THF can be reduced. In a case where either one or both of the alkali metal atoms and the alkaline earth metal atoms, which are derived from the metal organic acid salt B, are contained in an amount of less than 0.000005 parts by mass (0.05 mg/kg) based on 100 parts by mass of the polyester resin A, the suppressive effect on the residues on mold is hardly exerted by the action of the metal organic acid salt B. Further, in a case where either one or both of the alkali metal atoms and the alkaline earth metal atoms exceed 0.05 parts by mass (500 mg/kg) based on 100 parts by mass of the polyester resin A, it may promote the decomposition of the polyester resin composition, and may deteriorate the residues on mold and the fogging.

In addition, it is preferred that the polyester resin composition contains either one or both of the alkali metal atoms and the alkaline earth metal atoms in an amount of 0.0005 to 0.05 parts by mass based on 100 parts by mass of the polyester resin A. This numerical range is more preferably 0.0005 to 0.04 parts by mass (5 to 400 mg/kg), furthermore preferably 0.0006 to 0.03 parts by mass (6 to 300 mg/kg), and particularly preferably 0.0007 to 0.02 parts by mass (7 to 200 mg/kg).

The metal kind of the metal organic acid salt B, which can be used in the polyester resin composition of the present invention, is preferably one or two or more kinds selected from the group consisting of lithium, sodium, potassium, calcium, and magnesium from the viewpoint of the residues on mold. Among them, lithium, sodium, and potassium are more preferred, and potassium is most preferred.

Specific examples of the salt of an alkali metal or an alkaline earth metal include salts of these metals of a saturated aliphatic carboxylic acid such as formic acid, acetic acid, propionic acid, butyric acid, and oxalic acid, an unsaturated aliphatic carboxylic acid such as acrylic acid, and methacrylic acid, an aromatic carboxylic acid such as benzoic acid, a halogen-containing carboxylic acid such as trichloroacetic acid, a hydroxycarboxylic acid such as lactic acid, citric acid, salicylic acid, and gluconic acid, an organic sulfonic acid such as 1-propanesulfonic acid, 1-pentanesulfonic acid, and naphthalene sulfonic acid, an organic sulfuric acid such as lauryl sulfate, and a carbonic acid. Note that a carbonic acid salt is usually recognized as an inorganic acid salt, but in the present invention, an acid having carbon is regarded as an organic acid, and the carbonic acid salt is included in the range of organic acid salts.

From the viewpoint of the effect of suppressing the residues on mold and the handling ability, it is preferred that the metal organic acid salt B is one or two or more kinds selected from the group consisting of lithium acetate, sodium acetate, potassium acetate, calcium acetate, magnesium acetate, lithium benzoate, sodium benzoate, and potassium benzoate. Among them, one or two or more kinds selected from the group consisting of lithium acetate, sodium acetate, potassium acetate, calcium acetate, and magnesium acetate are preferred, and potassium acetate is particularly preferred. In addition, these metal organic acid salts B may be used singly alone or in combination with greater than or equal to two kinds thereof.

The method for allowing the metal organic acid salt B to be contained in the polyester resin composition is not particularly limited. For example, a method in which the metal organic acid salt B is added at an initial stage of the polymerization (after the esterification reaction or after the transesterification reaction) of the polybutylene terephthalate resin constituting a polyester resin A, a method in which the metal organic acid salt B is added at a later stage of the polymerization (during the polycondensation step (pressure reduction step) or after completion of the polymerization) of the polybutylene terephthalate resin, a method in which the metal organic acid salt B is allowed to adhere onto a surface of a pellet after pelletization or to permeate into a pellet, a method in which a master pellet containing the metal organic acid salt B in a high concentration is prepared in advance, and the master pellet is mixed at the time of the melt kneading for obtaining a polyester resin composition, or the like can be adopted. Further, a method in which a master pellet containing the metal organic acid salt B in a high concentration is added at the time of molding into a molded article may be adopted. Note that the above-described initial stage of the polymerization and later stage of the polymerization of the polybutylene terephthalate resin mean the initial stage of the polymerization and the later stage of the polymerization, respectively in the so-called melt polymerization of a polybutylene terephthalate resin.

In a case where the metal organic acid salt B is allowed to be contained when producing the polybutylene terephthalate resin, a part of the metal organic acid salt B to the added amount may be removed outside the reaction system under the reduced pressure condition in some cases. Therefore, the amount of the metal organic acid salt B to be added is required to be determined by taking into consideration the reactor to be used, the conditions, and the like, further after grasping the amount of the metal organic acid salt B (that is, either one or both of the alkali metal atoms and the alkaline earth metal atoms) remaining in the polyester resin composition by several times of trial experiments as needed. In addition, when the polyester resin composition of the present invention is produced by kneading using a twin-screw extruder or the like, there are some cases where the similar thing happens at the time of vent degassing (pressure reduction), therefore, it is required to determine the amount of the metal organic acid salt B to be added by taking necessary measures.

In particular, in the present invention, when constituting the polyester resin composition so that either one or both of the alkali metal atoms and the alkaline earth metal atoms, which are derived from the metal organic acid salt B, are contained in an amount of 0.0005 to 0.05 parts by mass (5 to 500 mg/kg) based on 100 parts by mass of the polyester resin A, the polyester resin composition is preferably obtained by using a master pellet containing the metal organic acid salt B in a high concentration. As the base resin of the master pellet, it is preferably any one of the resins that constitute the polyester resin composition, and more preferably a polybutylene terephthalate resin having the largest proportion in the polyester resin composition. The master pellet containing the metal organic acid salt B in a high concentration can be produced by mixing a base resin and the metal organic acid salt B, and melt-kneading the resultant mixture. The method of melt-kneading may be a known method, and a single-screw extruder, a twin-screw extruder, a pressure kneader, a Bunbury mixer, or the like can be used. Among them, a twin-screw extruder is preferably used.

The content of the metal organic acid salt B in master pellet is also specified on the basis of the content of either one or both of the alkali metal atoms and the alkaline earth metal atoms, and as the content, either one or both of the alkali metal atoms and the alkaline earth metal atoms is preferably 0.02 to 1.5 parts by mass (200 to 15000 mg/kg) based on 100 parts by mass of the master pellets. When the content in the master pellet exceeds 1.5 parts by mass, the base resin is decomposed at the time of the preparation of master pellets, and adverse influence may be exerted when the master pellets are allowed to be contained in the polyester resin composition. When the content in the master pellet is less than 0.02 parts by mass, the content of the metal organic acid salt B as the master pellet is small, and the productivity is not favorable.

The reason why these metal organic acid salts B have an effect of suppressing the residues on mold is presumed to be as follows. That is, the metal organic acid salt B suppresses a hydrolysis reaction of the polybutylene terephthalate resin due to the effect of stabilizing the ester group or the so-called buffer effect, and further suppresses a backbiting reaction of the terminal hydroxyl group. In this way, mainly the generation of tetrahydrofuran can be suppressed. Therefore, the polyester resin composition according to the present invention can obtain low gas emission, and a significant effect of suppressing the residues on mold.

In the method for allowing the metal organic acid salt B to be contained in the polyester resin composition, the reason why it is preferred to add the master pellets of the metal organic acid salt B, which have been prepared in advance, at the time of kneading or at the time of molding of the polyester resin composition rather than adding the metal organic acid salt B in the polyester polymerization step is as follows.

In a case where the metal organic acid salt B is added at the timing of the initial stage of the polymerization (after the esterification reaction or after the transesterification reaction) of the polybutylene terephthalate resin constituting a polyester resin A, and the later stage of the polymerization (during the polycondensation step (pressure reduction step) or after completion of the polymerization) of the polybutylene terephthalate resin, the terephthalic acid as the raw material and the alkali metal or alkaline earth metal in the metal organic acid salt B form a salt, and an effect of the metal organic acid salt B is lost, therefore there is a risk that an effect of suppressing the residues on mold is lowered. In addition, as the formed salt precipitates and becomes seeds, a favorable appearance (mirror surface appearance showing particularly smoothness) cannot be obtained, and foreign substances such as the precipitated salts become a starting point of material destruction and the mechanical properties may also be lowered (in a case where the metal organic acid salt B is added after completion of the polymerization, uniform dispersion is difficult due to the high viscosity of the resin, and the metal organic acid salt B itself may become seeds).

On the other hand, in a case where the master pellets of the metal organic acid salt B, which have been prepared in advance, are added at the time of kneading or at the time of molding of the polyester resin composition, the period of time during which the polyester resin A is in a molten state in the presence of the metal organic acid salt B can be shortened, and not only the above-described problems are solved, but also the decomposition of the polyester resin A is reduced, therefore, the deterioration of color tone (increase of yellowish) is suppressed, and the fogging resistance can be maintained.

Accordingly, it is preferred to add the metal organic acid salt B at the time of kneading or at the time of molding of the polyester resin composition as the master pellet rather than adding the metal organic acid salt B at the time of the polymerization of a polybutylene terephthalate resin.

The polyester resin composition according to the present invention has a tendency that the Color-b value in an L*a*b* color system is increased and the yellowish is also increased by including the metal organic acid salt B, however, from the viewpoint of the quality and the color blur when colored, it is preferred to suppress the Color-b value of the polyester resin composition to less than or equal to 6. Herein, the method of adding the metal organic acid salt B by the master pellet is preferred because of having a tendency that the Color-b value is decreased as compared with the method of adding the metal organic acid salt B at the time of the polymerization of a polybutylene terephthalate resin. The Color-b value of the polyester resin composition is more preferably less than or equal to 5, and furthermore preferably less than or equal to 4.

The Color-b value can be obtained, for example, by performing a measurement on a mirror surface of a flat plate having a mirror surface on one side thereof (molded using a mold having a mirror surface), which has been obtained by injection molding of a polyester resin composition, using a commercially available precision-type spectrophotometric colorimeter or the like in accordance with JIS Z 8722: 2009, and JIS Z 8781-4: 2013.

<Inorganic Filler C>

The polyester resin composition according to the present invention contains an inorganic filler C having an average particle diameter of 0.05 to 3 μm in an amount of 1 to 13 parts by mass based on 100 parts by mass of the polyester resin A. By setting the content of the inorganic filler C within such a range, the heat resistance and the rigidity are further improved, and the shrinkage factor can be controlled to be smaller. In particular, when the shrinkage factor is large, a mold release failure due to the sticking to the mold at the time of injection molding may be generated. In a case where the molded article is large or a case where the shape is complicated, distortion may be generated in the molded article due to the shrinkage factor to be large, therefore, it is extremely important to control the shrinkage factor to be small by the inorganic filler C.

In a case where the content of the inorganic filler C is less than 1 part by mass, the effect of improving the heat resistance and the rigidity is small. When the content of the inorganic filler C exceeds 13 parts by mass, the surface smoothness required for use as a lamp member is impaired due to the floating of a filler.

From the viewpoint of the improvement of the heat resistance and rigidity, and the surface smoothness, the content of the inorganic filler C is preferably greater than or equal to 2 parts by mass, and further, from the viewpoint of the shrinkage factor control, the content of the inorganic filler C is more preferably greater than or equal to 4 parts by mass and is further preferably greater than or equal to 5 parts by mass. From the viewpoint of the surface smoothness, the content of the inorganic filler C is preferably less than or equal to 11 parts by mass and is more preferably less than or equal to 9 parts by mass.

The inorganic filler C is required to have an average particle diameter (50% diameter in a volume cumulative particle diameter distribution) of less than or equal to 3 μm as measured by a laser diffraction method. When the average particle diameter exceeds 3 μm, the surface smoothness of a molded article of the polyester resin composition is impaired. The average particle diameter of the inorganic filler C is preferably less than or equal to 2 μm. From the viewpoint of the suppression of aggregation (poor dispersion) and the handleability (ease of feeding and the like), the lower limit of the average particle diameter of the inorganic filler C is preferably 0.05 μm.

It is preferred that the inorganic filler C is one or two or more kinds selected from the group consisting of calcium carbonate, silica, kaolin and barium sulfate. These inorganic fillers can be prepared with a relatively smaller particle diameter than that of the others, therefore, it is easy to maintain the surface smoothness even when the addition amount is large. Among them, from the viewpoint of reducing the specific gravity of the polyester resin composition, calcium carbonate, silica, and kaolin are preferred, and from the viewpoint of the dispersibility in the polyester resin composition, and the handling ability, calcium carbonate is more preferred.

The inorganic filler C may be surface-treated in order to improve the compatibility with the polyester resin composition and the dispersibility in the polyester resin composition. Note that in a case of performing the surface treatment, it is preferred to perform the surface treatment to the extent that the surface treatment does not influence on other properties such as fogging due to gas generation.

Examples of the surface treatment include a treatment with a surface treatment agent such as an amino silane coupling agent, an epoxy silane coupling agent, and an aluminate-based coupling agent, a treatment with silica, a treatment with fatty acid, a treatment with $SiO_2$—$Al_2O_3$, and a neutralization treatment with an acid compound such as a phosphorus compound, and these treatments may be employed in combination. From the viewpoint of the fogging, a treatment with silica, a treatment with an epoxy silane coupling agent, and a treatment with an alkyl silane coupling agent are preferred.

The surface treatment method of the inorganic filler C is not particularly limited, and a method for physically mixing the inorganic filler C and each of treatment agents can be mentioned, and for example, a grinder such as a roll mill, a high-speed rotary grinder, or a jet mill, or a mixer such as a Nauta mixer, a ribbon mixer, or a Henschel mixer may be used.

<Others>

(Release Agent D)

The polyester resin composition of the present invention may contain a release agent D in order to further improve the releasability. The release agent D is preferably a fatty acid ester compound from the viewpoint of suppressing the residues on mold. In this fatty acid ester compound, a compound in which carboxylic acid is partially esterified with monoglycol or polyglycol, and a compound partially forming a metal salt may be contained. The content of the release agent D is preferably 0.05 to 3 parts by mass based on 100 parts by mass of the polyester resin A. When the content of the release agent D is less than 0.05 parts by mass, a sufficient release effect cannot be obtained, and there is a risk that mold release failure, release wrinkles, or the like is generated. The release agent D itself gasifies, or bleeds out, and as a result, the residues on mold are caused. Further, for example, when a polyester resin composition containing the release agent D is applied to a lamp for an automobile, the release agent D adheres to a cover, a mirror, or the like of a headlamp under a temperature environment in the range of 100° C. to 200° C., and fogging is caused. These problems become remarkable when the content of the release agent D exceeds 3 parts by mass.

With the specific configuration described above, when the polyester resin composition of the present invention is injection-molded, using a mirror-surface mold having a temperature of 45° C. and surface-finished with #16000, at a molding temperature of 260° C. for a packing time of greater than or equal to 4.5 seconds, a flat plate of 100 mm×100 mm×2 mmt (100 mm in length, 100 mm in width, and 2 mm in thickness) can be obtained to have a maximum height roughness (Rz) of less than or equal to 0.70 μm. The maximum height roughness (Rz) of the flat plate is preferably less than or equal to 0.50 μm.

<Method for Producing Polyester Resin Composition>

As for the method for producing the polyester resin composition according to the present invention, the polyester resin composition can be produced by mixing each of the above-described components, and an additive to be added as needed such as a stabilizer, and melt-kneading the resultant mixture. As the method of melt kneading, a known method can be used, and for example, the melt-kneading can be performed by using a single-screw extruder, a twin-screw extruder, a pressure kneader, a Bunbury mixer, or the like. Among them, a twin-screw extruder is preferably used. As the general melt-kneading condition, in a case of using a twin-screw extruder, the cylinder temperature may be set to 250 to 280° C., and the kneading time may be set to 2 to 15 minutes.

The method for molding the polyester resin composition according to the present invention is not particularly limited, and the polyester resin composition can be molded by a known method such as injection molding, extrusion molding, blow molding, or the like. Among them, from the viewpoint of the versatility, an injection molding method is preferably used.

<Light-Reflector Component>

The light-reflector component according to the present invention contains the above polyester resin composition. The light-reflector component can be obtained by molding a polyester resin composition by a known method such as an injection molding method, an extrusion molding method, a blow molding method, or the like, and it is preferred that the light-reflector component is obtained by using an injection molding method from the viewpoint of the versatility. The light-reflector component becomes a light reflector described later by being provided with a light reflective metal layer.

<Light Reflector>

As for the light reflector according to the present invention, a light reflective metal layer is formed on at least a portion of a surface of the above light-reflector component. For example, the light reflector can be obtained by directly forming a metal thin film (for example, aluminum foil) as a light reflective metal layer on at least a part of a surface of the light-reflector component. In particular, it is preferred that the light reflector is obtained by overlaying at least a part of a surface of the light-reflector component with a metal thin film by metallization. The metallization method is not particularly limited, and a known method can be used.

The light reflector according to the present invention can be used as various kinds of components, for example, a lamp for an automobile (headlamp, or the like), a light reflector (extension, reflector, housing, or the like), and further, a lighting fixture, an electrical component, an electronic component, household general goods, and the like.

EXAMPLES

Hereinafter, the present invention is further specifically described by way of Examples, however, the present invention is not limited to these Examples. Note that the measurement values described in Examples are the values measured by the following method.

(1) Intrinsic viscosity (IV): the intrinsic viscosity (IV) of each of a polybutylene terephthalate resin "a" and a polyethylene terephthalate resin "b" was measured at 30° C. using a mixed solvent of phenol/tetrachloroethane (mass ratio 1/1) with an Ubbelohde-type viscometer. A time (seconds) required for the dropping of each of a polybutylene terephthalate resin "a" solution having a concentration of 0.4 g/dl at 30° C., a polyethylene terephthalate resin "b" solution having a concentration of 0.4 g/dl, and a mixed solvent only was measured, and a value was determined from the above equation (I).

(2) Terminal carboxyl group concentration (unit: eq/ton, expressed as the acid value): 0.5 g of a polybutylene terephthalate resin "a" was dissolved in 25 ml of benzyl alcohol, and the resultant mixture was titrated by using a 0.01 mol/l benzyl alcohol solution of sodium hydroxide. The indicator used was a solution obtained by dissolving 0.10 g of phenolphthalein in a mixture of 50 ml of ethanol and 50 ml of water. The determination of the terminal carboxyl group concentration of the polyethylene terephthalate resin "b" was also performed in the similar way.

(3) Terminal hydroxyl group concentration (unit: eq/ton): the determination of the terminal hydroxyl group concentration of the polybutylene terephthalate resin "a" was performed by $^1$H-NMR measurement with a resonance frequency of 500 MHz. As the measurement device, an NMR device (trade name: "AVANCE-500", manufactured by Bruker Corporation) was used.

Firstly, 10 mg of a polybutylene terephthalate resin "a" or 10 mg of a polyethylene terephthalate resin "b" was dissolved in 0.12 ml of a solvent including deuterated chloroform/hexafluoroisopropanol=1/1 (volume ratio), and then into the resultant mixture, 0.48 ml of deuterated chloroform and 5 μl of deuterated pyridine were added and thoroughly stirred to prepare a resin solution. After that, the resin solution was filled in an NMR tube and subjected to $^1$H-NMR measurement. Deuterated chloroform was used as a lock solvent, and the number of times of integration was set to 128.

Next, when the peak of chloroform appeared at 7.29 ppm in the measured $^1$H NMR spectrum, terephthalic acid peak (i) derived from polybutylene terephthalate or polyethylene terephthalate appeared at 8.10 ppm. Further, in a case of a polybutylene terephthalate resin "a", the terminal 1,4-butanediol peak (ii) appeared at 3.79 ppm. In a case of a polyethylene terephthalate resin "b", the terminal ethylene glycol peak (iii) appeared at 4.03 ppm. For these results, (i) to (iii) were taken as integral values of respective peaks, and the terminal hydroxyl group concentration was determined by the following equation.

In a case of a polybutylene terephthalate resin "a": $\{(ii) \times 1000000/2\}/\{(i) \times 220/4\}$=terminal hydroxyl group concentration (eq/ton)

In a case of a polyethylene terephthalate resin "b": $\{(iii) \times 1000000/2\}/\{(i) \times 192/4\}$=terminal hydroxyl group concentration (eq/ton)

(4) Titanium atom content, potassium atom content, and magnesium atom content: the polyester resin composition is wet-decomposed with high-purity sulfuric acid for electronic industry and high-purity nitric acid for electronic industry, and the measurement was performed by emission spectrometry using ICP (trade name: "SPECTROBLUE", manufactured by AMETEK. Inc.).

(5) Oligomer content: into 3 ml of a solvent including hexafluoroisopropanol/chloroform=2/3 (volume ratio), 0.1 g of a polyester resin composition is dissolved, and then into the resultant mixture, 20 ml of chloroform, and 10 ml of methanol were added to precipitate a polymer. Subsequently, the supernatant separated by filtration was dry-solidified, and then the dry-solidified material was dissolved in 10 ml of dimethylformamide, and then the resultant mixture was filtered, and the filtrate was subjected to quantitative determination of each of the oligomer components by a liquid chromatography analysis method. The quantitative value of the linear oligomers was calculated in terms of BHET (bishydroxyethyl terephthalate), and the quantitative value of the cyclic oligomers was calculated in terms of a polyethylene terephthalate cyclic trimer, each using a calibration curve. The measurement was performed under the following conditions.

Liquid chromatography analyzer: trade name: "Prominence" manufactured by Shimadzu Corporation Column: Shim-pack XR-ODS 2.2 μm (3×100 mm)

Mobile phase: A: 0.2% acetic acid water, B: acetonitrile

Gradient: 0 min (10% B), 25 min (100% B), 27 min (100% B), 27.01 min (10% B), 32 min (10% B)

Flow rate: 1.1 ml/min

Column temperature: 50° C.

Injection volume: 5 μl

Detection wavelength: UV 258 nm.

(6) Color-b value (flat plate): an injection molding machine (trade name: "EC100N", manufactured by TOSHIBA MACHINE CO., LTD.) was prepared, and a flat molded article of 100 mm×100 mm×2 mm made of a polyester resin composition was obtained by injection molding using a mold having a mirror surface that had been polished with a file of #6000. This flat molded article had a mirror surface transferred from the mold on one side of the flat molded article. The cylinder temperature at the time of molding was 260° C. and the mold temperature was 60° C. Using a precision-type spectrophotometric colorimeter (trade name: "TC-1500SX", manufactured by Tokyo Denshoku CO., LTD.), the Color-b value on the mirror surface side of the flat molded article was measured in accordance with JIS Z 8722: 2009, and JIS Z 8781-4: 2013. As the measurement conditions, a D65 light source, a 10° field of view, and a 0°-d method were used.

(7) Residues on mold acceleration test: an injection molding machine (trade name: "EC100N", manufactured by TOSHIBA MACHINE CO., LTD.) was prepared, and as the mold, a continuous molding evaluation type (having a cavity with an outer diameter of 30 mm, an inner diameter of 20 mm, and a thickness of 3 mm, and a flow terminal is a recessed part and no degassing) was prepared. Using this mold, a polyester resin composition was continuously molded by a short shot method so that the ingredients facilitating the residues on mold of outgas, oligomers, and the like are easily accumulated in a recessed part on the opposite side of a gate part, and the degree of the residues on mold was observed. The molding was performed with a cylinder temperature of 260° C., a mold temperature of 50° C., and a cycle time of 40 seconds at the time of molding, and the residues on mold after 20 shots was evaluated. The residues on mold were photographed with a digital camera, and an image obtained by subjecting the photographed image to gray scale processing in order to make the color of image uniform was evaluated through visual inspection as follows.

A: Residues are not observed

B: Residues are hardly observed

C: Residues are vaguely observed at the center in the vicinity of the recessed part on the opposite side of the gate part D: Residues are black and noticeable with a clear contour at the center in the vicinity of the recessed part on the opposite side of the gate part (8) Mirror-surface appearance (visual inspection and maximum height roughness)

An injection molding machine (trade name: "EC100N", manufactured by TOSHIBA MACHINE CO., LTD.) was prepared, and a flat molded article of 100 mm×100 mm×2 mm made of a polyester resin composition was obtained by injection molding using a mold having a mirror surface that had been polished with a file of #16000. This flat molded article had a mirror surface transferred from the mold on one side of the flat molded article. At the time of molding, the cylinder temperature was 260° C. and the mold temperature was 45° C. In order to facilitate formation of a flow mark and floating of the filler on the surface, the packing time was greater than or equal to 4.5 seconds in the molding. Whether or not there is a defect (whitening, surface roughness, or flow mark) resulting from the flow mark and floating of the filler on the mirror surface of the molded article is evaluated in accordance with the visual inspection and the maximum height roughness (Rz). For the maximum height roughness (Rz), a height roughness having the maximum value is employed for the evaluation from height roughnesses measured at five locations within a range of 10 mm from the flow terminal at a magnification of 20× using a laser microscope (trade name: "Color 3D laser microscope VK-9700", manufactured by KEYENCE CORPORATION).

(Mirror Surface Appearance: Visual Inspection)

⊚: No whitening, no surface roughness, and no flow mark at all.

○: Whitening, surface roughness, and flow mark are slightly observed depending on the angle of visual inspection, but there is no problem in practical use.

x: Whitening, surface roughness, and flow mark are noticeable.

(Mirror Surface Appearance: Maximum Height Roughness (Rz))

○: Maximum height roughness (Rz) is less than or equal to 0.70 μm.

x: Maximum height roughness (Rz) is greater than 0.70 μm.

(9) Thermal deformation temperature (load: 0.45 MPa)

Using an injection molding machine (trade name: "EC100N" manufactured by TOSHIBA MACHINE CO., LTD.), a multipurpose test specimen of ISO-3167 was molded under the conditions of a cylinder temperature of 260° C. and a mold temperature of 60° C. For this multipurpose test specimen, a thermal deformation temperature was measured when loaded at 0.45 MPa in accordance with ISO-75.

(10) Molding shrinkage factor

Using an injection molding machine (trade name: "EC100N" manufactured by TOSHIBA MACHINE CO., LTD.), a flat molded article of 100 mm×100 mm×2 mm made of a polyester resin composition was obtained by injection molding under the conditions of a cylinder temperature of 260° C. and a mold temperature of 60° C. After 24 hours from the molding, the width of the molded article in each of a flow direction and a direction perpendicular to the flow direction was measured with a vernier caliper, and the molding shrinkage factor (average value of the molding shrinkage factors in the flow direction, and the direction perpendicular to the flow direction) was calculated by the following equation.

$$\text{Molding shrinkage factor: } [\{100-(\text{width of molded article in flow direction})\}/100 + \{100-(\text{width of molded article in direction perpendicular to the flow direction})\}/100]/2$$

The ingredients used in Examples and Comparative examples are shown below.

The polyester resin A includes any one of the following polybutylene terephthalate resins "a", or includes any one of the following polybutylene terephthalate resins "a", and a polyethylene terephthalate resin "b".

As the polybutylene terephthalate resin "a", any one of the following resins was used.

a-1: IV=0.83 dl/g, terminal hydroxyl group=95 eq/ton, acid value=9 eq/ton, and titanium atom content=80 mg/kg (a melt-polymerized resin of IV=0.78 dl/g was used, and solid phase polymerization was performed at 210° C. until reaching IV=0.83 dl/g). Provided that as the metal organic acid salt B, potassium acetate 10 mg/kg was added at the time of melt polymerization (after esterification reaction) of the melt-polymerized resin.

a-2: IV=0.83 dl/g, terminal hydroxyl group=95 eq/ton, acid value=9 eq/ton, and titanium atom content=80 mg/kg (a melt-polymerized resin of IV=0.78 dl/g was used, and solid phase polymerization was performed at 210° C. until reaching IV=0.83 dl/g). Provided that the metal organic acid salt B was added by master pellets at the time of melt kneading.

a-3: IV=0.83 dl/g (a resin obtained by melt polymerization), terminal hydroxyl group=100 eq/ton, acid value=10 eq/ton, and titanium atom content=80 mg/kg (no special treatment was performed to reduce the content of linear oligomers). Provided that as the metal organic acid salt B, potassium acetate 10 mg/kg was added at the time of melt polymerization (after esterification reaction) of the resin.

a-4: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that the metal organic acid salt B was not added.

a-5: IV=0.83 dl/g (a resin obtained by melt polymerization), terminal hydroxyl group=100 eq/ton, acid value=10 eq/ton, and titanium atom content=80 mg/kg (no special treatment was performed to reduce the content of linear oligomers). Provided that the metal organic acid salt B was added by master pellets at the time of melt kneading.

It should be noted that in the case of each of the polybutylene terephthalate resins a-1 and a-3, the metal organic acid salt B including the above-described amount of potassium acetate was added at the time of melt polymerization (after esterification reaction). The residual amount (content) of the metal organic acid salt B in the polyester resin composition was as shown in Tables 1 and 2 below. To the polybutylene terephthalate resins "a-2" and "a-5", the metal organic acid salt B including potassium acetate was adjusted so as to have the contents shown in the following Tables 1 and 2 by using the master pellets that had been prepared in advance, and added at the time of melt kneading to obtain a polyester resin composition. To the polybutylene terephthalate resin "a-4", the metal organic acid salt B was not added.

Polyethylene terephthalate resin "b": IV=0.62 dl/g, and acid value=30 eq/ton.

As the metal organic acid salt B, the following compounds were used.

B-1: potassium acetate (manufactured by Wako Pure Chemical Industries, Ltd.)

B-2: master pellets of potassium acetate (manufactured by Wako Pure Chemical Industries, Ltd.)

Note that as the base resin of the above-described master pellets, the same resin as the polybutylene terephthalate resin present in the polyester resin composition to which the master pellets are added was used. In metal organic acid salt B in the master pellets, the content of the potassium atoms is 0.2 parts by mass based on 100 parts by mass of the master pellet.

As the inorganic filler C, the following compounds were used.

The following average particle diameter indicates a value measured by a laser diffraction method (50% diameter in a volume cumulative particle diameter distribution).

C-1: Light calcium carbonate [trade name: "RK-92BR3F", manufactured by Shiraishi Kogyo Kaisha, Ltd. (treated with a silica/epoxy silane coupling agent, average particle diameter: 0.15 μm)]

C-2: Light calcium carbonate [trade name: "RK-82BR1F", manufactured by Shiraishi Kogyo Kaisha, Ltd. (treated with a silica/alkyl silane coupling agent, average particle diameter: 0.15 μm)]

C-3: Light calcium carbonate [trade name: "RK-87BR2F", manufactured by Shiraishi Kogyo Kaisha, Ltd. (treated with silica, average particle diameter: 0.15 μm)]

C-4: fused silica [trade name: "MC3000", manufactured by KINSEI MATEC CO., LTD. (average particle diameter: 1.2 μm)]

C-5: hydrous kaolin [trade name: "ASP-200", manufactured by BASF (average particle diameter: 0.4 μm)]

C-6: precipitated barium sulfate [trade name: "B-54", manufactured by Sakai Chemical Industry Co., Ltd. (average particle diameter: 0.7 μm)]

C-7: calcium carbonate [trade name: "SCP E-#45", manufactured by HAYASHI KASEI CO., LTD. (average particle diameter: 20.0 μm)]

C-8: barium sulfate [trade name: "BMH-100", manufactured by Sakai Chemical Industry Co., Ltd. (average particle diameter: 11.6 μm)].

As the release agent D, the following compounds were used.

D-1: a triglycerol behenic acid full ester (trade name: "POEM TR-FB", manufactured by RIKEN VITAMIN Co., Ltd.)

As the stabilizer, an antioxidant (trade name: IRGANOX1010", manufactured by BASF) was used. This stabilizer was contained in an amount of 0.2 parts by mass based on 100 parts by mass of the polyester resin A.

Examples 1 to 11 and Comparative Examples 1 to 10

The ingredients mixed in the combinations shown in Tables 1 and 2 were kneaded in a co-rotating twin-screw extruder set at a cylinder temperature of 260° C., and the obtained strands were water-cooled and pelletized. Each of the obtained pellets was dried at 130° C. for 4 hours, and a polyester resin composition corresponding to each of Examples and Comparative Examples was obtained. On these polyester resin compositions, each of the above-described evaluation tests (4) to (10) was performed.

With respect to the amount of metal organic acid salt B, in Examples and Comparative Examples in which the metal organic acid salt B had been added at the time of melt polymerization (after the esterification reaction), the residual amount (content) in the polyester resin composition after melt kneading was decreased relative to the amount at the time of addition (it is considered that the metal organic acid salt B may have been distilled off in the pressure reduction step at the later stage, and in the vent degassing step at the time of melt kneading). Further, in Comparative Example 2 (example using the polybutylene terephthalate resin a-4), the metal organic acid salt B was not added. The above results are shown in the following Tables 1 and 2.

TABLE 1

| | Kind | Unit | | Ex. 1 | Ex. 2 | Ex. 3 | Ex. 4 |
|---|---|---|---|---|---|---|---|
| Mixed Composition | Polyester Resin (A) | Parts by Mass | a-1 | 87.5 | — | — | — |
| | | | a-2 | — | 87.5 | 86 | 87.5 |
| | | | a-3 | — | — | — | — |
| | | | a-4 | — | — | — | — |
| | | | a-5 | — | — | — | — |
| | | | b | 12.5 | 12.5 | 14 | 12.5 |

TABLE 1-continued

|  |  |  |  |  |  |  |  |
|---|---|---|---|---|---|---|---|
|  | Metal Organic Acid Salt (B) *1 | Parts by Mass | B-1 | 0.0002 | — | — | — |
|  |  |  | B-2 | — | 0.001 | 0.001 | 0.001 |
|  | Inorganic Filler (C) | Parts by Mass | C-1 | 5 | 5 | 5 | 8 |
|  |  |  | C-2 | — | — | — | — |
|  |  |  | C-3 | — | — | — | — |
|  |  |  | C-4 | — | — | — | — |
|  |  |  | C-5 | — | — | — | — |
|  |  |  | C-6 | — | — | — | — |
|  | Release Agent (D) | Parts by Mass | D-1 | 0.3 | 0.3 | 0.3 | 0.3 |
| Properties of Composition | Titanium Atom Content | mg/kg | — | — | 67 | 67 | 66 | 65 |
| Characteristics of Molded Article | Linear Oligomer Content | mg/kg | — | — | 910 | 910 | 910 | 880 |
|  | Color-b | — | — | — | 1.9 | 1.9 | 2.1 | 1.9 |
|  | Residues on Mold | — | — | — | B | B | B | B |
|  | Mirror Surface Appearance (Visual Inspection) | — | — | — | ⊙ | ⊙ | ⊙ | ⊙ |
|  | Mirror Surface Appearance (Maximum Height Roughness) | μm/Evaluation | — | — | 0.35/○ | 0.38/○ | 0.38/○ | 0.40/○ |
|  | Thermal Deformation Temperature | ° C. | — | — | — | 133 | — | — |
|  | Molding Shrinkage Factor | — | — | — | 14/1000 | 14/1000 | 14/1000 | 13/1000 |

|  | Kind | Unit |  | Ex. 5 | Ex. 6 | Ex. 7 | Ex. 8 |
|---|---|---|---|---|---|---|---|
| Mixed Composition | Polyester Resin (A) | Parts by Mass | a-1 | — | — | — | — |
|  |  |  | a-2 | 87.5 | 87.5 | 87.5 | 87.5 |
|  |  |  | a-3 | — | — | — | — |
|  |  |  | a-4 | — | — | — | — |
|  |  |  | a-5 | — | — | — | — |
|  |  |  | b | 12.5 | 12.5 | 12.5 | 12.5 |
|  | Metal Organic Acid Salt (B) *1 | Parts by Mass | B-1 | — | — | — | — |
|  |  |  | B-2 | 0.001 | 0.001 | 0.001 | 0.001 |
|  | Inorganic Filler (C) | Parts by Mass | C-1 | 10 | — | — | — |
|  |  |  | C-2 | — | 5 | — | — |
|  |  |  | C-3 | — | — | 5 | — |
|  |  |  | C-4 | — | — | — | 5 |
|  |  |  | C-5 | — | — | — | — |
|  |  |  | C-6 | — | — | — | — |
|  | Release Agent (D) | Parts by Mass | D-1 | 0.3 | 0.3 | 0.3 | 0.3 |
| Properties of Composition | Titanium Atom Content | mg/kg | — | 63 | 67 | 67 | 67 |
| Characteristics of Molded Article | Linear Oligomer Content | mg/kg | — | 900 | 910 | 910 | 910 |
|  | Color-b | — | — | 2.2 | 2.0 | 2.0 | 2.0 |
|  | Residues on Mold | — | — | B | B | B | B |
|  | Mirror Surface Appearance (Visual Inspection) | — | — | ○ | ⊙ | ⊙ | ○ |
|  | Mirror Surface Appearance (Maximum Height Roughness) | μm/Evaluation | — | 0.42/○ | 0.39/○ | 0.39/○ | 0.43/○ |
|  | Thermal Deformation Temperature | ° C. | — | 152 | — | — | — |
|  | Molding Shrinkage Factor | — | — | 13/1000 | 14/1000 | 14/1000 | 14/1000 |

|  | Kind | Unit |  | Ex. 9 | Ex. 10 | Ex. 11 |
|---|---|---|---|---|---|---|
| Mixed Composition | Polyester Resin (A) | Parts by Mass | a-1 | — | — | — |
|  |  |  | a-2 | 87.5 | 87.5 | 87.5 |
|  |  |  | a-3 | — | — | — |
|  |  |  | a-4 | — | — | — |
|  |  |  | a-5 | — | — | — |
|  |  |  | b | 12.5 | 12.5 | 12.5 |
|  | Metal Organic Acid Salt (B) *1 | Parts by Mass | B-1 | — | — | — |
|  |  |  | B-2 | 0.001 | 0.001 | 0.001 |
|  | Inorganic Filler (C) | Parts by Mass | C-1 | — | — | 4 |
|  |  |  | C-2 | — | — | — |
|  |  |  | C-3 | — | — | — |
|  |  |  | C-4 | — | — | — |
|  |  |  | C-5 | 5 | — | — |
|  |  |  | C-6 | — | 5 | 1 |
|  | Release Agent (D) | Parts by Mass | D-1 | 0.3 | 0.3 | 0.3 |
| Properties of Composition | Titanium Atom Content | mg/kg | — | 67 | 67 | 67 |
| Characteristics of Molded Article | Linear Oligomer Content | mg/kg | — | 910 | 910 | 910 |
|  | Color-b | — | — | 2.0 | 2.0 | 2.0 |
|  | Residues on Mold | — | — | B | B | B |
|  | Mirror Surface Appearance (Visual Inspection) | — | — | ○ | ⊙ | ⊙ |
|  | Mirror Surface Appearance (Maximum Height Roughness) | μm/Evaluation | — | 0.40/○ | 0.44/○ | 0.40/○ |
|  | Thermal Deformation Temperature | ° C. | — | — | — | — |
|  | Molding Shrinkage Factor | — | — | 14/1000 | 14/1000 | 14/1000 |

*1 The parts by mass of the metal organic acid salt (B) indicates the parts by mass of the metal atoms (potassium) remaining in the polyester resin composition.

TABLE 2

| | Kind | Unit | | Comp. Ex. 1 | Comp. Ex. 2 | Comp. Ex. 3 | Comp. Ex. 4 | Comp. Ex. 5 |
|---|---|---|---|---|---|---|---|---|
| Mixed Composition | Polyester Resin (A) | Parts by Mass | a-1 | — | — | — | — | — |
| | | | a-2 | 80 | — | — | — | 87.5 |
| | | | a-3 | — | 87.5 | — | — | — |
| | | | a-4 | — | — | 87.5 | — | — |
| | | | a-5 | — | — | — | 87.5 | — |
| | | | b | 20 | 12.5 | 12.5 | 12.5 | 12.5 |
| | Metal Organic Acid Salt (B) *1 | Parts by Mass | B-1 | — | 0.0002 | — | — | — |
| | | | B-2 | 0.001 | — | — | 0.001 | 0.001 |
| | Inorganic Filler (C) | Parts by Mass | C-1 | 5 | 5 | 5 | 5 | — |
| | | | C-7 | — | — | — | — | — |
| | | | C-8 | — | — | — | — | — |
| | Release Agent (D) | Parts by Mass | D-1 | 0.3 | 0.3 | 0.3 | 0.3 | 0.3 |
| Properties of Composition | Titanium Atom Content | mg/kg | | — | 61 | 67 | 25 | 67 | 70 |
| | Linear Oligomer Content | mg/kg | | — | 910 | 1150 | 910 | 1150 | 950 |
| Characteristics of Molded Article | Color—b | — | | — | 2.1 | 1.9 | 1.7 | 1.9 | 2.0 |
| | Residues on Mold | — | | — | B | D | D | D | B |
| | Mirror Surface Appearance (Visual Inspection) | — | | — | X | ⊙ | X | X | ⊙ |
| | Mirror Surface Appearance (Maximum Height Roughness) | μm/Evaluation | | — | 0.74/X | 0.35/○ | 0.40/○ | 0.39/○ | 0.39/○ |
| | Thermal Deformation Temperature | °C. | | — | — | — | — | — | 120 |
| | Molding Shrinkage Factor | — | | — | — | — | — | — | 16/1000 |

| | Kind | Unit | | Comp. Ex. 6 | Comp. Ex. 7 | Comp. Ex. 8 | Comp. Ex. 9 | Comp. Ex. 10 |
|---|---|---|---|---|---|---|---|---|
| Mixed Composition | Polyester Resin (A) | Parts by Mass | a-1 | — | — | — | — | — |
| | | | a-2 | 87.5 | 87.5 | 87.5 | 90 | 90 |
| | | | a-3 | — | — | — | — | — |
| | | | a-4 | — | — | — | — | — |
| | | | a-5 | — | — | — | — | — |
| | | | b | 12.5 | 12.5 | 12.5 | 10 | 10 |
| | Metal Organic Acid Salt (B) *1 | Parts by Mass | B-1 | — | — | — | — | — |
| | | | B-2 | 0.001 | 0.001 | 0.001 | 0.001 | 0.001 |
| | Inorganic Filler (C) | Parts by Mass | C-1 | 15 | — | — | 5 | 10 |
| | | | C-7 | — | 5 | — | — | — |
| | | | C-8 | — | — | 5 | — | — |
| | Release Agent (D) | Parts by Mass | D-1 | 0.3 | 0.3 | 0.3 | 0.3 | 0.3 |
| Properties of Composition | Titanium Atom Content | mg/kg | | 61 | 67 | 67 | 69 | 66 |
| | Linear Oligomer Content | mg/kg | | 860 | 910 | 910 | 910 | 900 |
| Characteristics of Molded Article | Color-b | — | | 2.2 | 2.0 | 2.0 | 2.1 | 2.2 |
| | Residues on Mold | — | | B | B | B | B | B |
| | Mirror Surface Appearance (Visual Inspection) | — | | X | X | X | ○ | X |
| | Mirror Surface Appearance (Maximum Height Roughness) | μm/Evaluation | | 1.1/X | 1.2/X | 1.2/X | 0.35/○ | 1.1/X |
| | Thermal Deformation Temperature | °C. | | — | — | — | — | — |
| | Molding Shrinkage Factor | — | | — | — | — | 16/1000 | 14/1000 |

*1 The parts by mass of the metal organic acid salt (B) indicates the parts by mass of the metal atoms (potassium) remaining in the polyester resin composition.

As shown in Table 1, it is understood that in accordance with the predetermined ingredients in the present application, each of the polyester resin compositions of Examples 1 to 11 attains extremely less residues on mold at the time of continuous molding, thus attaining an excellent characteristic in terms of mirror surface appearance.

As shown in Table 2, Comparative Example 1 is an example in which an excessively large amount of the polyethylene terephthalate resin b was provided in polyester resin A to cause formation of a flow mark, with the result that the mirror surface appearance tended to be deteriorated. Each of Comparative Examples 2 to 4 corresponds to at least one of an example in which the content of the linear oligomers is more than the specified range and an example in which no metal organic acid salt B is included. Residues tended to be more likely to be on the mold than those in the Examples.

Further, when the thermal deformation temperature is compared among the case of Comparative Example 5 in which no inorganic filler is contained and the cases of Examples 2 and 5 in which the constitution of the compositions other than the inorganic filler is the same as each other, the thermal deformation temperature in Comparative Example 5 was 120° C., while the thermal deformation temperature in Example 2 was 133° C., and the thermal deformation temperature in Example 5 was 152° C., and it was evaluated that the heat resistance was low in Comparative Example 5. Furthermore, in Examples 1 to 11, the molding shrinkage factor was 13/1000 to 14/1000, while in Comparative Example 5, the molding shrinkage factor was 16/1000. In Comparative Example 5, it can be said that there is a high possibility that distortion is generated in the molded article in a case where a mold release failure due to the sticking to the mold at the time of injection molding is generated or the molded article is large, in a case where the shape is complicated, or the like.

In Comparative Example 6, the inorganic filler C was excessive, and an appearance defect due to floating of a filler was observed. In Comparative Examples 7 and 8, the average particle diameter of the inorganic filler C was large exceeding a predetermined value, and the mirror surface appearance was deteriorated due to poor dispersion.

Each of Comparative Examples 9 and 10 is an example in which an excessively small amount of the polyethylene terephthalate resin b was provided and the respective molding shrinkage factors thereof were 16/1000 and 14/1000. In Comparative Example 9, it can be said that there is a high possibility that distortion is generated in the molded article in a case where a mold release failure due to the sticking to the mold at the time of injection molding is generated or the molded article is large, in a case where the shape is complicated, or the like. Meanwhile, since the amount of addition of the inorganic filler was increased in Comparative Example 10, the molding shrinkage factor was suppressed; however, the appearance was deteriorated due to floating of the filler.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A polyester resin composition comprising:
   a polyester resin A that contains 82 to 88% by mass of a polybutylene terephthalate resin and 12 to 18% by mass of a polyethylene terephthalate resin;
   a metal organic acid salt B that is either one or both of an alkali metal organic acid salt and an alkaline earth metal organic acid salt; and
   an inorganic filler C having an average particle diameter of 0.05 to 3 µm in an amount of 1 to 13 parts by mass based on 100 parts by mass of the polyester resin A,
   wherein the polyester resin composition includes either one or both of alkali metal atoms and alkaline earth metal atoms in an amount of 0.000005 to 0.05 parts by mass based on 100 parts by mass of the polyester resin A,
   wherein, in the polyester resin composition, a content of linear oligomers of polybutylene terephthalate, or a content of the linear oligomers of the polybutylene terephthalate and linear oligomers of polyethylene terephthalate is less than or equal to 1000 mg/kg,
   wherein the polyester resin composition achieves a maximum height roughness (Rz) of less than or equal to 0.70 µm,
      wherein the maximum height roughness (Rz) is measured by injection-molding the polyester resin composition using a mirror-surface mold having a temperature of 45° C. and surface-finished with #16000, at a molding temperature of 260° C. for a packing time of greater than or equal to 4.5 seconds, to obtain a flat plate of 100 mm in length×100 mm in width×2 mm in thickness, and measuring the maximum height roughness (Rz) of the flat plate.

2. The polyester resin composition according to claim 1, wherein the polyester resin composition includes either one or both of the alkali metal atoms and the alkaline earth metal atoms in an amount of 0.0005 to 0.05 parts by mass based on 100 parts by mass of the polyester resin A.

3. The polyester resin composition according to claim 1, wherein a metal kind of the metal organic acid salt B is one or two or more kinds selected from a group consisting of lithium, sodium, potassium, calcium, and magnesium.

4. The polyester resin composition according to claim 1, wherein the metal organic acid salt B is one or two or more kinds selected from a group consisting of lithium acetate, sodium acetate, potassium acetate, calcium acetate, magnesium acetate, lithium benzoate, sodium benzoate, and potassium benzoate.

5. The polyester resin composition according to claim 1, wherein the inorganic filler C is one or two or more kinds selected from a group consisting of calcium carbonate, silica, kaolin, and barium sulfate.

6. A light-reflector component comprising the polyester resin composition according to claim 1.

7. A light reflector, wherein a light reflective metal layer is formed at least on a portion of a surface of the light-reflector component according to claim 6.

8. The polyester resin composition according to claim 1, wherein the polyester resin A contains 85 to 88% by mass of the polybutylene terephthalate resin and 12 to 15% by mass of the polyethylene terephthalate resin.

9. The polyester resin composition according to claim 1, wherein the polyester resin A contains 86 to 87.5% by mass of the polybutylene terephthalate resin and 12.5 to 14% by mass of the polyethylene terephthalate resin.

10. The polyester resin composition according to claim 1, wherein the polyester resin composition achieves a maximum height roughness (Rz) of less than or equal to 0.50 µm.

11. The polyester resin composition according to claim 1, further comprising a release agent (D) in an amount of 0.05 to 3 parts by mass based on 100 parts by mass of the polyester resin A.

12. The polyester resin composition according to claim 1, further comprising a release agent (D) in an amount of 0.03 parts by mass based on 100 parts by mass of the polyester resin A,
   wherein the polyester resin A contains 86 to 87.5% by mass of the polybutylene terephthalate resin and 12.5 to 14% by mass of the polyethylene terephthalate resin,
   wherein the polyester resin composition includes either one or both of alkali metal atoms and alkaline earth metal atoms in an amount of 0.0002 to 0.01 parts by mass based on 100 parts by mass of the polyester resin A, and
   wherein the polyester resin composition contains the inorganic filler C having an average particle diameter of 0.05 to 3 µm in an amount of 5 to 10 parts by mass based on 100 parts by mass of the polyester resin A.

* * * * *